United States Patent [19]

Temme

[11] 4,093,065

[45] June 6, 1978

[54] MACHINE FRAME ASSEMBLIES FOR SCRAPER-CHAIN CONVEYORS

[75] Inventor: Helmut Temme, Waltrop, Germany

[73] Assignee: Gewerkschaft Eisenhutte Westfalia, Germany

[21] Appl. No.: 691,236

[22] Filed: Jun. 1, 1976

[30] Foreign Application Priority Data

Jun. 6, 1975 Germany .............................. 2525343

[51] Int. Cl.² ............................................ B65G 19/28
[52] U.S. Cl. .................................... 198/735; 198/834; 198/862
[58] Field of Search ............... 198/735, 729, 834, 841, 198/860, 861, 862; 299/43-45, 64-66

[56] References Cited

U.S. PATENT DOCUMENTS

| 2,156,020 | 4/1939 | Lathrop | 198/836 |
| 2,422,726 | 6/1947 | Goldacker | 198/836 |
| 2,810,470 | 10/1957 | Zeegers | 198/735 |
| 2,810,564 | 10/1957 | Zeegers | 198/735 |

FOREIGN PATENT DOCUMENTS

| 1,249,121 | 11/1960 | France | 198/735 |
| 1,544,410 | 10/1968 | France | 299/64 |
| 1,298,490 | 7/1969 | Germany | 198/860 |
| 2,143,648 | 3/1973 | Germany | 299/43 |
| 2,149,396 | 4/1973 | Germany | 198/860 |
| 2,340,274 | 2/1975 | Germany | 198/735 |
| 691,913 | 5/1953 | United Kingdom | 198/834 |
| 939,728 | 10/1963 | United Kingdom | 198/735 |
| 1,147,920 | 3/1968 | United Kingdom | 299/43 |

*Primary Examiner*—Evon C. Blunk
*Assistant Examiner*—Richard K. Thomson
*Attorney, Agent, or Firm*—Charles E. Pfund

[57] ABSTRACT

A drive station or machine frame assembly for a scraper-chain conveyor has a convertible frame with side walls between which a drive drum for the associated scraper-chain assembly is mounted. The frame has first and second plates arranged one above the other and extending between the side walls. The uppermost plate is detachable whereas the lowermost plate is fixed. Both plates are inclined and can form part of an ascending conveying surface prolonged by using one or more channel structure with side walls and a floor plate aligned with the plate of the frame which is used. The uppermost plate is used with a larger-size drive drum and can be removed to expose the lowermost plate for use with a smaller-size drive drum. Known forms of tongue or guide plates and chain deflectors can be mounted to the frame.

10 Claims, 3 Drawing Figures

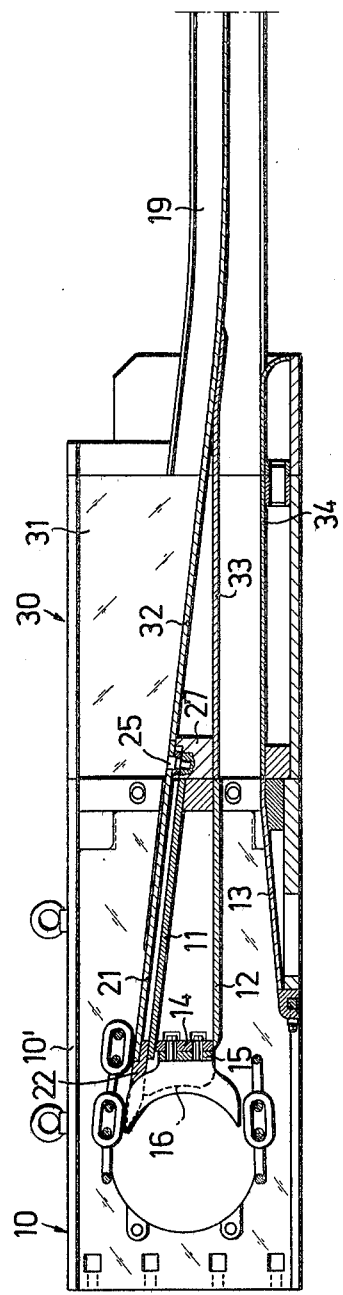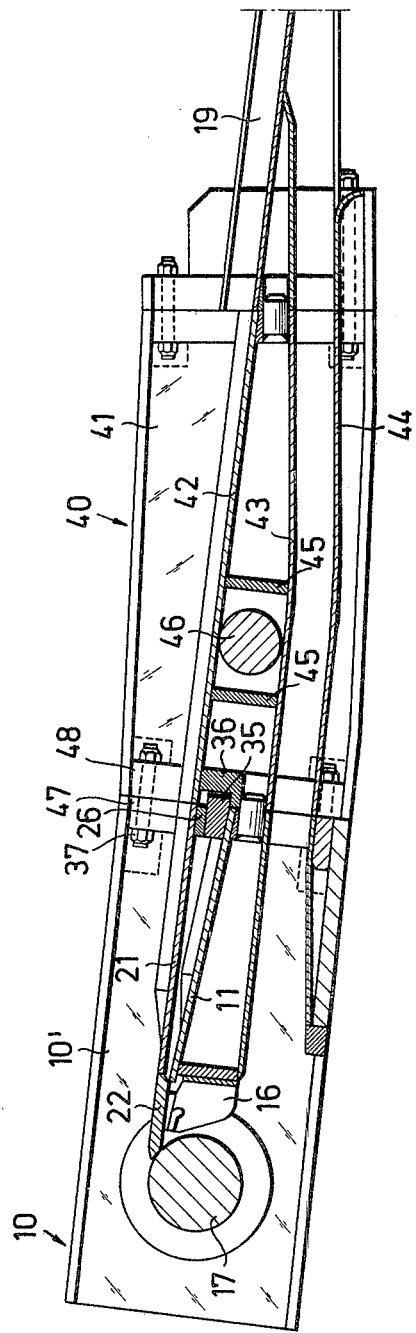

MACHINE FRAME ASSEMBLIES FOR SCRAPER-CHAIN CONVEYORS

BACKGROUND TO THE INVENTION

The present invention relates to machine frame assemblies for scraper-chain conveyors.

As is known scraper-chain conveyors used in mining are usually composed of a series of channel sections or pans arranged end-to-end and a scraper-chain assembly which is circulated along the pans to convey material. The scraper-chain assembly may employ a single chain or two chains running side-by-side. Machine frames or stations are usually located at each end of the conveyor and it is known to provide main and auxiliary drive means for the scraper-chain assembly at these respective stations. The main drive station is conventionally located at the end where the material is discharged, usually onto a further conveyor. Often, drive means for a machine, such as a plough, is also provided at one or other or both of the drive stations. It is also known to provide chain strippers or deflectors which serve to disengage the chains of the scraper-chain assembly from chain wheels at the drive stations. It is usually desirable to make the material ascend gently at the discharge zone and to this end the main drive station may employ an inclined floor plate which forms part of the conveying surface and which leads to the top region of the drum around which the scraper-chain assembly is entrained. To provide continuity for the conveying surface and to act as a guide, a recessed plate accommodating the chain wheel or wheels of the drive can be mounted so as to have projecting tongues leading to the drum itself. It is useful to mount this so-called tongue plate so that it can be readily detached to permit the drum to be removed and replaced. See for example German Patent Specification No. 1080479.

It is also known in connection with scraper-chain conveyors to utilize scraper-chain assemblies of different sizes. This necessitates the provision of drums and chain wheels of differing sizes and mounting systems permitting their detachment and replacement. Since the position of the tongue plate and the inclination of the floor plate is wholly dependent on the size of the drum and chain wheel used it has hitherto been known to provide a number of frames each designed for use with a particular size of drum and chain wheel. In this case the entire frame would be detached and replaced when a different size scraper-chain assembly is to be used.

It is also known to provide a frame which has means for adjusting the position of the floor plate so that a single frame can be adapted to suit various sizes of drums and chain wheels. Problems can arise however with this form of construction.

A general object of this invention is to provide an improved machine frame assembly.

SUMMARY OF THE INVENTION

According to the invention there is provided a machine frame assembly for a scraper-chain conveyor; said assembly comprising a frame with side walls between which rotatable means for driving a scraper-chain assembly can be arranged and first and second inclined plates disposed one above another between the side walls, the first uppermost plate serving to form at least part of a conveying surface leading to the means for driving the scraper-chain assembly and being detachable to permit the second lower-most plate to form at least part of the conveying surface.

The invention also provides an assembly which comprises a frame with side walls between which drums of different diameter can be mounted to drive a scraper-chain assembly, the frame also having a first plate extending between the side walls and being mounted for detachment and a second plate extending between the side walls and being disposed beneath the first plate; wherein the first plate or the second plate can be used to form part of an inclined conveying surface which ascends to the upper region of the drum, the first plate being removed to expose the second of the conveying surface when a drum of smaller diameter is used.

The conversion of the assembly to cope with drive means or drums of different sizes can be accomplished quite easily by removing or installing the first or uppermost plate. The second or lowermost plate can be welded between the side walls of the frame while the first or uppermost plate can be connected with the aid of screws or the like. It is preferable to adapt the second plate so that it is suitable for a normal sized drive means or drum. Then where a larger sized drive means or drum is to be used the first plate can be installed.

The first or uppermost plate may have an insert at its front edge which forms the known guide or tongue plate usually recessed to accommodate the chain wheel or chain wheels of the drive means. Where the first plate is used to form part of the conveying surface the material has to be lifted to the upper part of the somewhat larger drive means from whence it is discharged. To provide a smooth ascending conveying surface which does not rise too steeply it is advisable to connect the frame to a channel structure also having side walls and an inclined floor plate therebetween. This floor plate then aligns with the first plate of the frame and enables the conveying surface to ascend at an even gradient which is not too steep and which does not necessitate an increase in the length of the frame itself. A preferred construction utilizes an intermediate channel structure detachably connected between the frame and a further channel structure also having side walls and an inclined floor plate extending the conveying surface to the endmost pan or channel section of the conveyor. The first and second plates may be disposed parallel to one another and the first plate preferably has support means, preferably underneath its front zone nearest the drive means or drum, which engages on the second plate. This support means may be a projection of the insert or a separate strip of material extending across the plate. Where the first plate is removed a separate guide or tongue plate, complementary to the insert, can be affixed to the second plate. Thus in both cases the conveying surface leads onto a tongue plate guiding the material over the drum or drive means. The separate tongue plate for use with the second plate can be affixed with screws, for example, and the frame may have a connecting device which enables the tongue plate or the first plate to be detachably secured to the frame. This connecting device may be mounted to a support for a chain deflector or may form part of this support.

Alternatively a cross-piece welded between the walls of the frame may form the connecting device or may be used to mount the connecting device.

It is advisable for the first plate to extend rearwardly beyond the frame to engage on a mounting or support built into the channel structure detachably secured to the frame.

In the case where an intermediate channel structure is employed, a construction can be adopted where the channel structure and the frame are angularly offset. This can be accomplished by making the connection line between the frame and the structure, usually between flanges, inclined to the vertical. The first and second plates can then converge towards the drive means or drum and the angle between these plates may be the same as that between the frame and the channel structure. The channel structure preferably also has another plate disposed beneath its floor plate. A shaft forming part of a machine drive means mounted to the channel structure can then extend between the plates of the structure and a chain wheel can be carried by the shaft on the side of the structure remote from the drive motor.

In another aspect the invention provides in a machine frame assembly for a scraper-chain conveyor which has a frame with side walls between which drums of different diameter can be mounted to drive a scraper chain assembly and a floor plate extending between the side walls and capable of forming part of an inclined conveying surface leading to the upper region of the drum; the improvement comprising a further floor plate detachably connected to the frame and disposed above the first-mentioned plate to cover the latter and form part of said conveying surface when a drum of larger size is employed.

The invention may be understood more readily, and various other features of the invention may become more apparent from consideration of the following description.

BRIEF DESCRIPTION OF DRAWINGS

Embodiments of the invention will now be described, by way of example only, with reference to the accompanying drawings, wherein:

FIG. 2 is a schematic sectional side view of another inactive frame assembly made in accordance with the invention; and FIG. 3 is a schematic sectional side view of a further machine frame assembly made in accordance with the invention.

DESCRIPTION OF PREFERRED EMBODIMENTS

Figure 1:
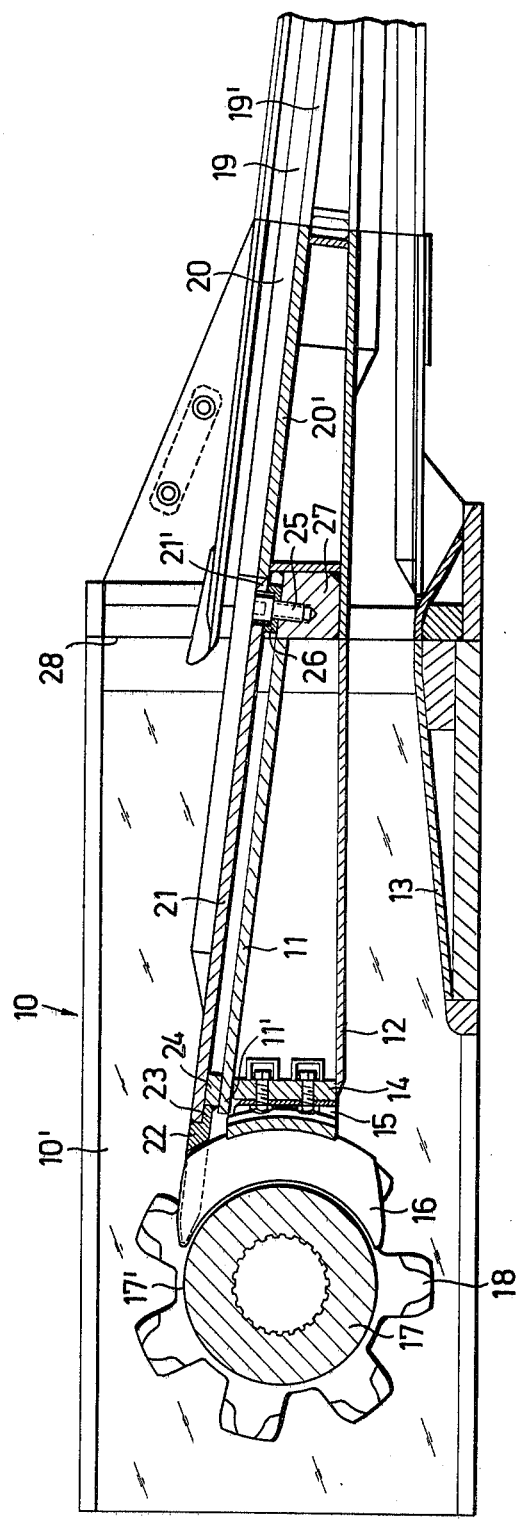
FIG. 1 is a schematic sectional side view of a machine frame assembly made in accordance with the invention.

As shown in FIG. 1, the assembly is composed of a main frame 10 with two parallel upstanding side walls 10' spaced apart and rigidly interconnected with a plurality of other components. A chain drum 17 having at least one chain wheel is mounted for rotation between the side walls 10'. The chain wheel 18 engages with the chain of a scraper-chain assembly of a scraper-chain conveyor incorporating the frame assembly as illustrated at one end. Where the scraper-chain assembly is of the type employing two chains running side-by-side the drum 17 would be provided with two chain wheels. The drum 17 would normally be driven by a motor or motors carried by the walls 10'.

A first plate 11 which may be used as a floor for the material being conveyed is welded between the walls 10' and takes an inclined disposition as shown. Beneath this first plate 11 there is a second plate 12 which is also welded between the walls 10'. The plate 12 takes a generally horizontal position. A third plate 13, forming a lower guide for the scraper-chain assembly, is disposed beneath the plate 12. This third plate 13 with a base structure is welded between the walls 10' and takes an inclined position. A transverse member or cross-piece 14 which is vertical is welded between the walls 10' and between the front end regions of the plates 11, 12. A support 15 is detachably secured to the member 14, as by screws or nuts and bolts, and this support 15 carries a chain stripper or deflector 16 of known type. The deflector 16 is of arcuate shape and serves to engage and guide the chain of the scraper-chain assembly thereby to ensure that the chain separate from the chain wheel.

The conveyor employs a series of channel sections or pans which are arranged end-to-end and the scraper-chain assembly is circulated along these channel sections in known manner. Material is conveyed over the floor plates of the channel sections towards the frame 10. As shown in FIG. 1, the frame 10 is connected through an intermediate channel or frame structure 20 to a further channel or frame structure 19 which would connect with the endmost of the series of channel sections (not shown). The frame 10, the structures 20, 19 and the channel section preferably have interengaging flanges connected together with screws or nuts and bolts permitting their detachment.

Each structure 19, 20 has a plate which aligns with the plate 12 of the frame 10 and an inclined floor plate 19', 20'. These plates would be welded between side walls in the same manner as the frame 10. The structure 20 has side walls which taper in height and an additional base unit which mates with the guide 13 of the frame 10. The plates 19', 20' are inclined and align with one another to form a continuous conveying floor surface over which the upper run of the scraper-chain assembly and the material being conveyed can ascend towards the uppermost region 17' of the drum 17. As the scraper-chain assembly runs around the drum 17 to return along the lower run the material is discharged and delivered onto a further conveying means such as a belt conveyor (not shown).

The frame 10 is provided with a further detachable plate 21 which forms a floor plate when used. The plate 21 aligns with the plates 19', 20' to continue the ascending conveying floor surface for the material. At its front end, i.e., relative to the drum 17 and in the region of the member 14, the plate 21 has an insert 22. This insert 22, which is of greater thickness than the plate 21, is welded to the forward edge of the body of the plate 21 to continue the conveying floor surface right up to the upper region 17' of the drum 17. The insert 22 has a recess which receives an edge portion of the plate 21 and a resultant rearwardly projecting lip 23 of the insert 22 extends back beneath the plate. The insert 22 is also recessed along its front edge to accommodate the chain wheel 18 and the deflector 16 and thus resembles the known form of tongue plate.

A support 24 in the form of a welded-on strip or bar extends across the underside of the plate 21 and engages on the forward region 11' of the plate 11. The support 24 abuts the lip 23 of the insert 22. Naturally the lip 23 can be prolonged to form the support and a separate strip would then be unnecessary. A similar complementary support 26 is provided at the rear end of the plate 21 and the rear end portion 21' of the plate 21 projects beyond the rear end 28 of the frame 10, i.e., the side walls 10'. At its front end engaging on the frame 10, the structure 20 is provided with a transverse cross-piece or web and a stout block 27 welded between the floor plate 20' and the subjacent horizontal plate. The support 26 engages on the block 27. The plate 21 is thus supported at its front and rear end regions and the supports 24, 26 serve to space the plate 11, 21 apart. The plate 21 is preferably detachably secured with screws. Thus, the block 27 can have threaded bores which receive screws 25, as shown, engaging through holes in the plate 21 and the support 26. Similarly, at the front end region the plate 21 can be secured with screws (not shown) which engage through holes in the plate 21 and possibly the support 24 to locate in threaded bores in the plate 11. It may however, be preferred to make the member 14 or the support 15 from a connecting device or carry additional connection devices, such as one or more strips which have threaded bores for the connection screws. These connecting devices can then serve to either aid the securing of the plate 21 or else to locate and secure a replaceable detachable guide or tongue plate (not shown) complementary to the insert 21 in the sense of having a recess for receiving the chain wheel 18 and the deflector 16. In this way the plate 21 can be removed and the guide plate introduced so that the conveying surface of the frame 10 is now the upper surface of the plate 11. Assuming that the assembly is in the operative state shown in FIG. 1, the scraper chain assembly is circulated to convey the material along the upper surfaces of the plates 21, 20', 19' in the manner described. In certain circumstances it may be desirable to replace the drum 17 and its chain wheel 18 with another drum and chain wheel of smaller diameter. This necessitates replacing the deflector 16 with one of correspondingly smaller size. In this conversion, the plate 21 is removed and the guide plate attached to the front end 11' of the plate 11 so that the plate 11 now forms part of the conveying surface which leads to the upper region of this smaller drum.

As mentioned the guide plate can be secured with screws to the connection devices carried by the member 14 or the support 15 although the guide plate can be secured directly to either of the latter-mentioned components. Besides modifying the frame 10 in the manner described to suit the smaller-diameter drum the entire intermediate structure 20 would also be removed so that the frame 10 is now secured directly to the structure 19. The appropriate degree of inclination of the conveying surface commensurate with the smaller-diameter drum would then be provided by the plates 11, 19' which are made to align with one another. The smaller-diameter drum would normally conform to a scraper-chain assembly of conventional size and the larger drum 17 with the additional plate 21 and the structure 20 would be used where a somewhat heavier and larger scraper-chain assembly is employed. It is however relatively easy to effect the modifications referred to and a standardized frame 10 can be constructed with the appropriate set of replacement parts.

In the other versions of the assembly depicted in FIGS. 2 and 3 like reference numerals are used to denote the parts which are the same as those depicted in FIG. 1. In the case of FIG. 2, the frame 10 is detachably connected, by inter-engaging flanges, with an intermediate structure 30 generally equivalent to the structure 20 of FIG. 1. The structure 30 thus has side walls 31 and plates 32, 33, 34 therebetween which plates are equivalent to the plates of the structure 20. In contrast to the side walls of the structure 20, the side walls 31 of the structure 30 have the same height as the side walls 10' of the frame 10. This is useful in that it permits a drive means for a plough or some other machine to be mounted to the exterior of the walls 31 and if necessary part of the drive means for the drum can be mounted to the walls 31.

In the version shown in FIG. 3, the intermediate structure, here denoted 40, and the main frame 10 are angularly offset. Thus, the connection flanges 47, 48 of the frame 10 and the structure 40 which are interconnected by means of bolts or the like 37 incline to the vertical. In contrast to FIGS. 1 and 2, where the plates 21, 11 are parallel, the plates 21, 11 of the FIG. 3 version converge towards the drum 17. To this end, the rear support 26 of the plate 21 engages on a modified mounting replacing the block 27 of FIG. 1. This mounting for the plate support 26 in FIG. 3 employs an L-shaped cross-piece 36 and a block 35 adapted to accommodate the plate 21. The angle formed between the plates 21, 11 is the same as the angle of inclination between the frame 10 and the structure 40. The structure 40 has side walls 41 with plates 42, 43, 44 therebetween. The plate 42 aligns with the plate 21 of the frame 10 to form part of the conveying surface. The plates 43, 44 are bent as shown to form a guide for the lower run of the scraper-chain assembly. Cross-pieces or webs 45 also extend between the side walls 41 of the structure 40 and these webs 45 are arranged between the plates 42, 43 to form a cavity which receives a drive shaft 46 of a plough drive means mounted to one of the side walls 41 at the exterior. On the side of the structure 40 opposite the drive means, the shaft 46 carries a chain wheel which meshes with the chain of the plough drive.

I claim:

1. In a machine assembly for a scraper-chain conveyor which has a frame composed of side walls and means for driving a scraper-chain assembly mounted between the side walls; the improvement comprising first uppermost and second lowermost inclined plates disposed one above another between the side walls, each plate having an upper surface which can form part of a conveying surface leading to said drive means, the uppermost plate being detachable to permit the lowermost plate to become operative as part of the conveying surface in dependence on the size of the drive means and the scraper-chain assembly, wherein an intermediate channel structure is disposed between the frame and a further channel structure, said further channel structure having side walls and an inclined plate between the side walls which aligns with the lowermost plate of the frame, said intermediate channel structure having side walls and an inclined plate between the side walls which aligns with the uppermost plate of the frame, and wherein the removal of the uppermost plate in converting the assembly for use with a smaller drive means is accompanied by the removal of the intermediate structure and the connection of the frame with the further structure.

2. An assembly according to claim 1, wherein the uppermost plate is provided with a support on its underside which engages on the lowermost plate.

3. An assembly according to claim 2 wherein the uppermost plate has an insert at its forward edge portion facing the drive means, the insert forming a guide and a continuation of the conveying surface of the uppermost plate, and wherein the insert has a projection extending beneath the uppermost plate and forming said support.

4. An assembly according to claim 3 wherein said frame has a connecting device, the uppermost plate is detachably secured to said connecting device of the frame which connecting device also serves for the connection of a guide plate complementary to said insert and locatable at the front edge portion of the lowermost plate when the first plate is removed.

5. An assembly according to claim 1, wherein the first and second plates are parallel to one another.

6. An assembly according to claim 1, wherein the first and second plates converge towards the drive means.

7. An assembly according to claim 6, wherein the intermediate channel structure has a further plate disposed beneath the second inclined plate between its side walls, the frame and intermediate structure being inclined in relation to one another at an angle which corresponds to the angle of convergence between the first and second plates.

8. An assembly according to claim 1, wherein the uppermost plate has an insert at its forward edge portion facing the drive means, the insert forming a guide and a continuation of the conveying surface.

9. An assembly according to claim 1, wherein the uppermost plate has a rearwardly projecting end portion supported by means provided on the intermediate channel structure where connected with the frame.

10. In a machine frame assembly for a scraper-chain conveyor which has a frame with side walls between which drums of different diameter can be mounted to drive a scraper-chain assembly and a floor plate extending between the side walls and capable of forming part of an inclined conveying surface leading to the upper region of the drum; the improvement comprising a further floor plate detachably connected to the frame and disposed above the first-mentioned floor plate to cover the latter and form part of said conveying surface when a drum of larger size is employed, wherein an intermediate channel structure is disposed between the frame and a further channel structure, said further channel structure having side walls and an inclined plate between the side walls which aligns with the floor plate of the frame forming part of the conveying surface, said intermediate channel structure having side walls and an inclined plate between the side walls which aligns with said further floor plate of said frame, and wherein the removal of the further plate in converting the assembly for use with the smaller diameter drum is accompanied by the removal of the intermediate structure and the connection of the frame with the further structure.

* * * * *